(12) United States Patent
Satou et al.

(10) Patent No.: US 7,845,165 B2
(45) Date of Patent: Dec. 7, 2010

(54) EXHAUST GAS PURIFYING SYSTEM

(75) Inventors: Hitoshi Satou, Fujisawa (JP); Takehito Imai, Fujisawa (JP); Tatsuo Mashiko, Fujisawa (JP); Takao Onodera, Fujisawa (JP); Makoto Takeuchi, Fujisawa (JP); Mamoru Komine, Fujisawa (JP); Nobuyuki Hiraki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 192 days.

(21) Appl. No.: 11/883,335

(22) PCT Filed: Nov. 10, 2005

(86) PCT No.: PCT/JP2005/020581
§ 371 (c)(1),
(2), (4) Date: Jul. 30, 2007

(87) PCT Pub. No.: WO2006/090514
PCT Pub. Date: Aug. 31, 2006

(65) Prior Publication Data
US 2008/0163609 A1    Jul. 10, 2008

(30) Foreign Application Priority Data
Feb. 24, 2005  (JP) ............................... 2005-048309

(51) Int. Cl.
*F01N 3/00* (2006.01)
(52) U.S. Cl. ............................... 60/295; 60/297; 60/303
(58) Field of Classification Search .................. 60/285, 60/295, 297, 303, 311
See application file for complete search history.

(56) References Cited

U.S. PATENT DOCUMENTS

| | | | |
|---|---|---|---|
| 6,588,204 B2 * | 7/2003 | Hirota et al. ................... | 60/297 |
| 6,644,023 B2 * | 11/2003 | Hirota et al. ................... | 60/297 |
| 6,836,710 B2 * | 12/2004 | Yamaki ....................... | 701/33 |
| 7,036,305 B2 * | 5/2006 | Nishimura .................... | 60/286 |
| 7,104,050 B2 * | 9/2006 | Sato et al. .................... | 60/295 |
| 7,181,909 B2 * | 2/2007 | Sato et al. .................... | 60/297 |
| 7,406,822 B2 * | 8/2008 | Funke et al. .................. | 60/297 |

FOREIGN PATENT DOCUMENTS

| | | |
|---|---|---|
| JP | 2003-155914 | 5/2003 |
| JP | 2003-155916 | 5/2003 |
| JP | 2003-155919 | 5/2003 |
| JP | 2004-143987 | 5/2004 |

OTHER PUBLICATIONS

International Search Report of International Published Application No. PCT/JP2005/020581 (mailed Feb. 21, 2006).

* cited by examiner

*Primary Examiner*—Tu M Nguyen
(74) *Attorney, Agent, or Firm*—Staas & Halsey LLP

(57) ABSTRACT

An exhaust emission control system including a continuous regenerating diesel particulate filter ("DPF") and a DPF controller, wherein a forced regenerator is operated by a driver's request, when it is judged that a traveling distance, after starting particulate matter collection, detected by a traveling distance detector has reached a predetermined judging traveling distance, even when the DPF controller detects that a collection amount detected by a collection amount detector is smaller than a prescribed judging collection amount. Accordingly, in a continuous regenerating DPF capable of manual regenerating, the number of warnings, such as a blinking regeneration button prompting a manual regeneration, is reduced to relieve a driver of annoyance or inconvenience.

2 Claims, 7 Drawing Sheets

Fig.7
(a) When manual regeneration is possible
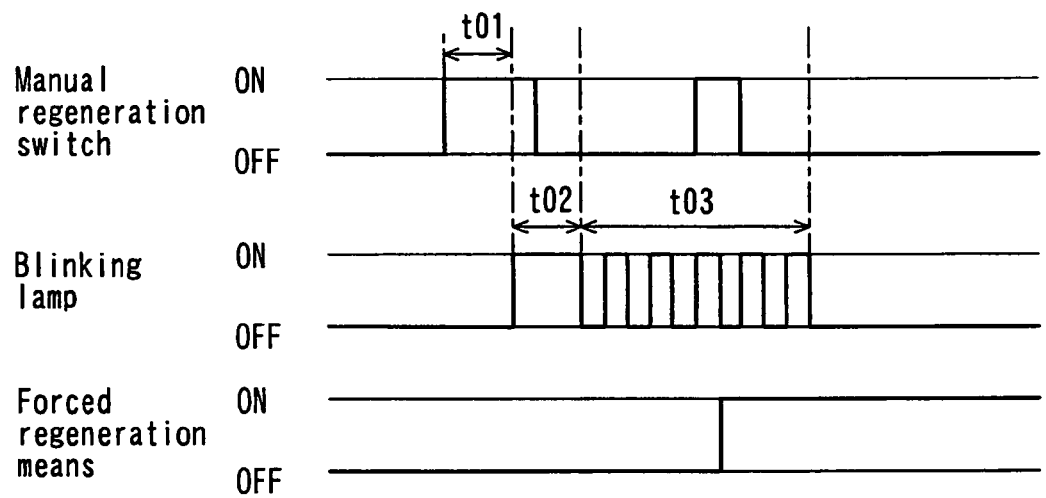
(b) When manual regeneration is impossible
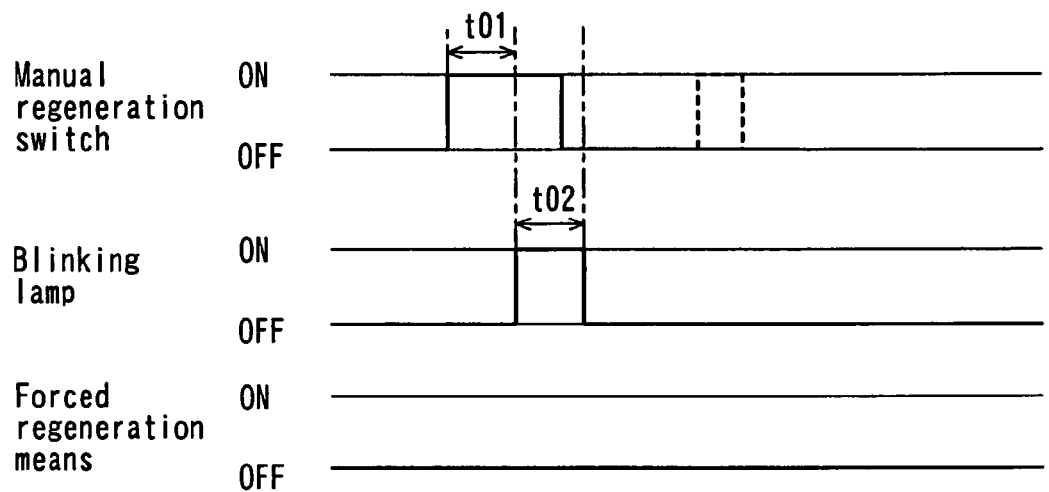

EXHAUST GAS PURIFYING SYSTEM

This application claims the benefit under 35 U.S.C. §371, of PCT International Application Number PCT/JP2005/020581, filed Nov. 10, 2005 and Japanese Application No. 2005-048309, filed Feb. 24, 2005, in Japan, the contents of which are incorporated herein by reference.

FIELD OF THE INVENTION

The present invention relates to an exhaust gas purifying system for purifying particulate matter with respect to the exhaust gases of an internal combustion diesel engine and the like by means of a continuous regenerating diesel particulate filter.

DESCRIPTION OF THE RELATED ART

Regulations for the amount of particulate matter (below called PM) discharged from a diesel engine have intensified year by year in addition to those for $NO_x$, CO and HC. Technology has developed in which this PM is collected by a filter called a diesel particulate filter (below called DPF) and the amount of PM discharged to the outside is reduced.

Types of DPF collecting this PM include wall-flow type of filters made out of ceramic monolith honeycomb and fiber type of filters made out of ceramic fibers or metal fibers. Exhaust gas purifying systems using these DPF have them positioned in the passage of exhaust gases from the internal combustion engine for purging and discharging the exhaust gases produced in an internal combustion engine just as other exhaust gas purifying systems do.

These DPF include continuous regenerating DPF with oxidation catalysts set up on the upstream side of the DPF device and continuous regenerating DPF which lower the PM combustion temperature through the action of catalysts supported in a filter with catalyst and incinerate the PM by the exhaust gases.

A continuous regenerating DPF with an oxidation catalyst on the upstream side is a device in which PM oxidation by $NO_2$ (nitrogen dioxide) is carried out at low temperature through oxidizing the PM by means of the oxygen in the exhaust gases. It is composed of an oxidation catalyst and a filter. In this type of DPF, NO (nitrogen monoxide) in the exhaust gas is oxidized to $NO_2$ by means of an oxidation catalyst that supports platinum and is arranged on the upstream side. The PM collected in the downstream side filter is oxidized to $CO_2$ (carbon dioxide) with this $NO_2$. In this way the PM is eliminated.

Furthermore, a continuous regenerating DPF using a filter with catalyst is constructed with a filter with catalyst such as cerium oxide ($CeO_2$). In this device the PM is oxidized in a low temperature region (300° C. to 600° C.) by reactions ($4CeO_2+C \rightarrow 2Ce_2O_3+CO_2$, $2Ce_2O_3+O_2 \rightarrow 4CeO_2$) in the catalyst-deposited filter using the $O_2$ (oxygen) in the exhaust gases. Additionally, the PM is oxidized by the $O_2$ in the exhaust gases at high temperatures (on the order of 600° C. and above) as high as or higher than the temperatures at which the PM is combusted with the $O_2$ in the exhaust gases.

With this continuous regenerating DPF device using a filter with catalyst, an oxidation catalyst is positioned on the upstream side and at the same time that unburned HC and CO are prevented from escaping into the atmosphere by oxidation of the HC and CO in the exhaust gases, the temperature of the exhaust gases is raised and elimination of PM by oxidation is promoted.

With this type of continuous regenerating DPF, the PM collected in this DPF when the exhaust gas temperature is approximately 350° C. or higher is continuously combusted and purified. In this manner the DPF is self-regenerating.

However, when the exhaust gas temperature is low, that is, when a low temperature state such as during engine idling operation or low load/low speed operations continues, the exhaust gas temperature is low, the catalyst temperature is lowered and there is no activation. As a result, the oxidation reactions are not promoted and the above given reactions do not occur. Consequently, because the PM cannot be oxidized and the filter cannot be regenerated, accumulation of PM in the filter continues and filter clogging is promoted. Accordingly, this produces the problem of increased exhaust pressure due to the clogging in this filter.

Consideration has been given to forcefully raising the exhaust gas temperature when this accumulation exceeds a prescribed accumulation amount and forcefully combusting the PM collected with respect to this filter accumulation. As a detection means for this filter clogging, there are some methods such as a detection method using a differential pressure before and after the filter, or a method to detect by calculating PM accumulation amount from a map data in which the PM collection amount is set up beforehand based on the operational state of the engine. Additionally, a method of injection control in cylinder injection and a method for fuel control in direct fuel injection into the exhaust pipe have been proposed as a means for raising exhaust gas temperatures.

For this cylinder injection control, when the exhaust gas temperature is lower than the activation temperature of the oxidation catalyst upstream of the DPF or of the oxidation catalyst supported on the DPF filter, multi-injection (multi-stage injection) is carried out and the exhaust gas temperature is raised. Also, when the exhaust gas temperature is raised higher than this activation temperature, post-injection (after injection) is carried out and the fuel in the exhaust gases is combusted through the oxidation catalyst. In this manner, the exhaust gases are raised to a temperature at or above that at which the PM collected in the DPF is combusted, the PM collected in the DPF is combusted to be removed, and the DPF is regenerated.

Normally, in this type of continuous regenerating DPF, when the accumulated PM amount reaches a PM accumulation threshold value which is previously set up, the operational state of the internal combustion engine automatically changes to a forced regenerating mode operation. In this manner the exhaust gas temperature is forcefully raised and the PM collected in the filter is oxidized, eliminated and regeneration processing is carried out.

Furthermore, as described in Japanese Patent Application Kokai Publication No. 2003-155914 and Japanese Patent Application Kokai Publication No. 2003-155916, when large amounts of particulate matter (PM) have accumulated in the DPF for whatever reason, methods for setting up an operational means near the driver's seat for running a forced regenerating means have been proposed so as to make forced regeneration of the particulate filter possible immediately at the discretion of the operator. This operational means more specifically consists of a warning lamp indicating an excessive collection state and a regeneration button for operating the forced regeneration means at one's discretion. It has been further proposed that, based on the differential pressure before and after the particulate filter (DPF), when an abnormal increase in the backpressure is noted, the particulate filter is to be judged as clogged and a warning is issued that promotes the forced regeneration artificially. In this forced regeneration the already collected particulate matter is forcefully combusted to be removed.

However, the following problem occurs when carrying out forced regeneration while the vehicle is traveling. Because the number of engine revolutions is high compared to idle regeneration, the amount of post-injection inevitably increases. Furthermore, even if the load changes and the temperature of the engine is raised during a transition period, the post-injection is continued. Then it is difficult to avoid wasteful injection (wasteful stroking). As a result of this, oil dilution, which is dilution of the oil from fuel, occurs repeatedly. Consequently, carrying out frequent forced regenerating processing is not favored.

Additionally, the inventors, on the one hand, attained the knowledge that because the above state does not exist and oil dilution is comparatively slight in forced regenerating control when the vehicle is in a stopped state, conducting forced regenerating control after the vehicle is stopped and not when the vehicle is traveling is preferred.

Thus, consideration has been given to the following regenerating method. When the filter is clogged with a prescribed amount, the driver (operator) is to be informed about the necessity for forced regeneration by the use of a lamp. The driver having received this information operates the regenerating button (manual regeneration switch) near the driver's seat after the vehicle has stopped. In this manner, forced regenerating control is carried out and the DPF is regenerated. When the operational conditions, idle for example, are stable when the vehicle is stopped, the oil dilution can be kept to a minimum by carrying out cylinder post-injection and raising the temperature. Furthermore, the problem of wearing or seizing of machine sliding parts occurs if the problem of the oil dilution is left. Then, its solution is important.

Consequently, automatic regeneration and manual regeneration have been provided as DPF forced regeneration. When regeneration is automatic, the driver does not factor in and regeneration is done automatically. When regeneration is manual, based on the discretion of the driver, the forced regenerating means is operated by request such as pushing the regeneration button.

Normally, DPF automatic regeneration is carried out while the vehicle is moving. However, when there is no opportunity for automatic regeneration or when DPF accumulation proceeds or the operational state of the vehicle changes when in automatic regeneration and regeneration is not completed, the regeneration button blinks and implementation of manual regeneration by the driver is promoted. When the driver sees this blinking lamp, he stops the vehicle and presses the regeneration button. In this manner, when the car is stopped to be idling, DPF regeneration is carried out by manual regeneration.

However, in reality, even when the regeneration lamp blinks and carrying out manual regeneration is called upon, as shown in the following cases there are times when the vehicle cannot be stopped and manual regeneration cannot be carried out. The driver cannot find the place for stopping the vehicle when the vessel is running on expressways and in traffic jams. The driver does not want to stop the vehicle while making deliveries. Even if the vehicle is stopped, the driver does not see the regeneration button because he is loading or unloading the vehicle.

When a situation arises where this type of manual regeneration cannot be implemented, the driver becomes annoyed because of the continuous blinking of the regeneration lamp prompting manual regeneration.

Additionally, on the other hand, when beginning driving or taking a break and when concluding driving, there are times from the driver's perspective when the vehicle can be stopped and manual regeneration can be carried out. Consequently, by carrying out manual regeneration when convenient for the driver, requests for forced regeneration can be kept to a minimum. Accordingly, this allows for a decrease in the number of times the manual regeneration on and off button blinks and can resolve the problem of the driver's being annoyed.

SUMMARY OF THE INVENTION

The objective of this invention is, in an exhaust gas purifying system that prompts the driver through a warning from a blinking regeneration button to stop the vehicle and carry out manual regeneration by operation of the regeneration button when the detected collection amount is greater than a prescribed determining collection amount, to provide an exhaust gas purifying system that can carry out servicing manual regeneration even when there is no demand for manual regeneration, when conditions are such that manual regeneration may be carried out and when the driver can take the time, in the garage for example, and can reduce the number of times of warning from the blinking lamp of the regeneration button that prompts manual regeneration and by means of this can minimize its annoyance to the driver.

The exhaust gas purifying system of this invention, for the purpose of attaining the above-stated objective, comprises a continuous regenerating diesel particulate filter in the passage of the exhaust gas from an engine in a vehicle and a diesel particulate filter control means, and the diesel particulate filter control means contains a collection amount detection means that detects the amount of collected matter in the continuous regenerating diesel particulate filter, a traveling distance detection means for detecting the distance that the vehicle has traveled, a forced regeneration means in which the exhaust temperature is caused to increase, the collection matter is forcefully combusted and the continuous regeneration diesel particulate filter is caused to regenerate and a warning means that, when the collection amount is detected by the collection amount detection means as being greater than a prescribed determining collection amount, issues a warning prompting a driver to operate the forced regeneration means, wherein the diesel particulate filter control means controls so as to accept the operation of the forced regeneration means when such operation is requested by the driver, if the traveling distance detected by the traveling distance detection means after collection has begun is determined to have reached a prescribed judging traveling distance even when the collection amount detected by the collection amount detection means is detected as being smaller than a prescribed judging collection amount.

Furthermore, the above-described exhaust gas purifying system is so structured that when accepting the operation of the forced regeneration means requested by the driver, the diesel particulate filter control means determines whether the traveling distance detected by the traveling distance detection means after the beginning of collection has reached a prescribed traveling distance or not when such operation is requested by the driver, indicates that the operation of the forced regeneration means is possible when the traveling distance is determined to have reached a prescribed judging traveling distance, and causes to operate the control regeneration means when an operational request is made again by the driver.

Furthermore, types of the above-mentioned continuous regenerating DPF device in this exhaust gas purifying system include a device supporting an oxidation catalyst on the filter, a device providing an oxidation catalyst on the upstream side of the filter, and a device providing an oxidation catalyst on the upstream side of the filter.

According to the exhaust gas purifying system of this invention, the traveling distance after forced regeneration is used in determining whether or not operation of the forced regenerating means for regenerating the DPF is possible. If vehicle has not traveled as far as the traveling distance where fuel commingled with the engine oil has evaporated and then oil dilution can be prevented in the forced regeneration when the vehicle is stopped, manual forced regeneration by the driver is not allowed, but after the vehicle has traveled the requisite traveling distance, manual operation by the driver of forced regeneration when the vehicle is stopped is allowed. In this manner it is possible to carry out the appropriate manual regeneration when convenient for the driver.

Consequently, while preventing wear or seizing of machine sliding parts in the engine caused by oil dilution at this forced regeneration time, manual regeneration can be carried out and the DPF can be force regenerated at a time favorable to the driver. As a result, the frequency of the blinking of the lamp when manual regeneration is required is minimized. Additionally, the prompting of manual regeneration when it is difficult for the driver to carry out manual regeneration is lessened. Accordingly, it is possible to alleviate the annoyance of the driver and improve convenience.

BRIEF DESCRIPTION OF THE DRAWINGS

FIG. 7 is a diagram showing the relationship between the manual regenerating switch allowing manual regeneration and the blinking lamp by a time series in which (a) shows when manual regeneration is possible and (b) shows when manual regeneration is not possible.

DETAIL DESCRIPTION OF THE INVENTION

An explanation is given below of the exhaust gas purifying system according to the present invention while referencing the diagrams. This system is using an exhaust gas purifying system with a continuous regenerating DPF device structured in combination with an oxidation catalyst and a filter with catalyst.

Figure 1:
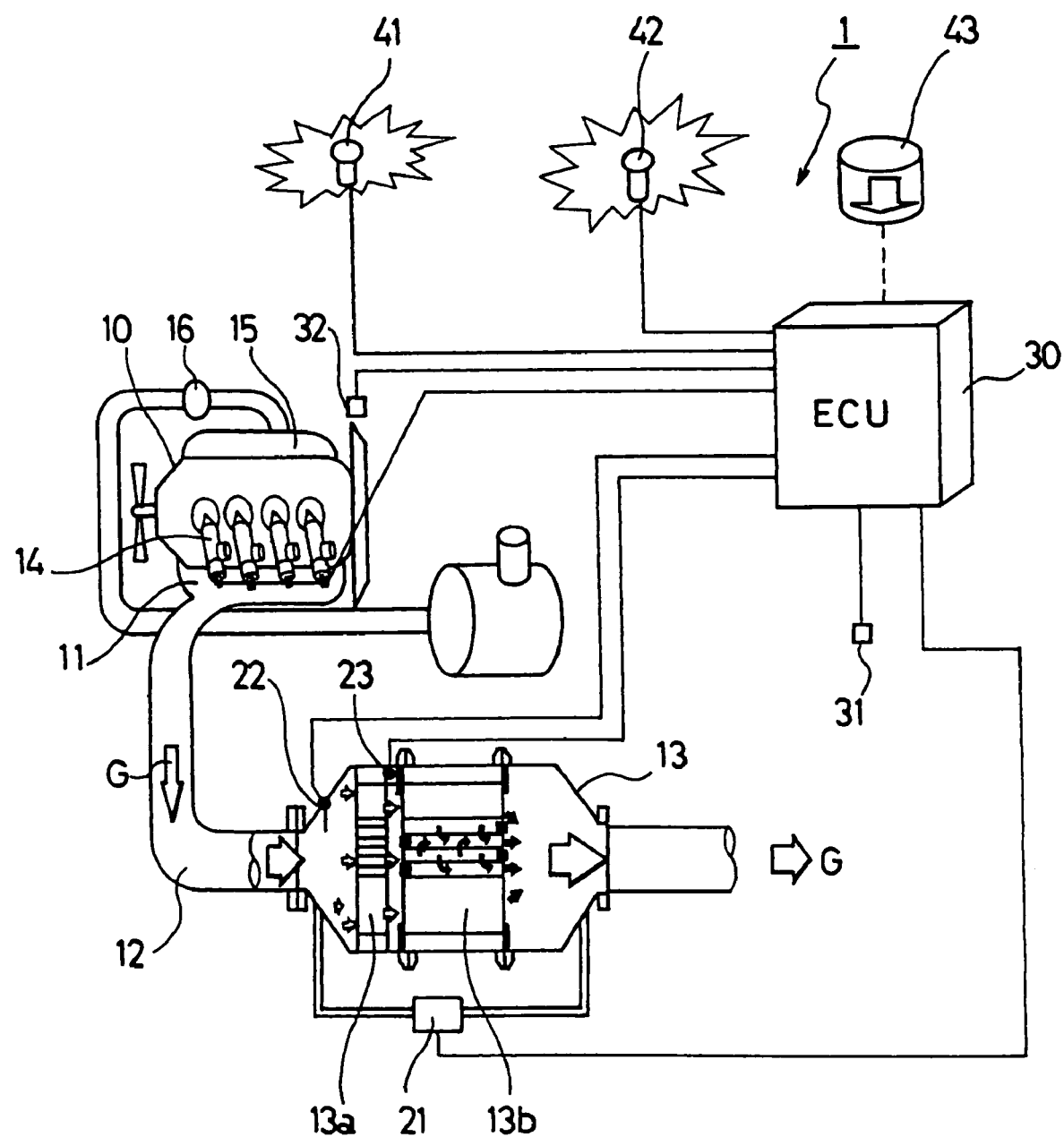
FIG. 1 is a systems structural diagram of the exhaust gas purifying system according to an embodiment of the present invention.

The structure of the exhaust gas purifying system 1 of an internal combustion engine of this embodiment is shown in FIG. 1. The structure of this exhaust gas purifying system 1 comprises a continuous regenerating DPF 13 set up in the exhaust passage 12 which is connected to the exhaust manifold 11 of the diesel engine 10. This continuous regenerating DPF 13 is structured with an oxidation catalyst 13a on the upstream side and a filter 13b with catalyst on the downstream side.

This oxidation catalyst 13a is formed by supporting an oxidation catalyst such as platinum (Pt) with a support member having a porous ceramic honeycomb structure. The filter 13b with catalyst is formed by a monolith honeycomb wall flow type filter with the inlet and outlet of the porous ceramic honeycomb channels alternately sealed, or is formed by a felt filter on which inorganic fibers of, aluminum for example, have been laminated. A platinum or cerium oxide catalyst is supported on part of this filter.

When using a monolith honeycomb wall flow type filter for the filter 13b with catalyst, the PM (particulate matter) in the exhaust gas G is collected (trapped) by the porous ceramic wall. When using a fiber filter type for the filter 13b with catalyst, the PM is collected by the inorganic fibers of the filter.

A differential pressure sensor 21 is placed in the conduction tube connected to the front and rear of the continuous regenerating DPF 13 in order to estimate the accumulated amount of PM in the filter 13b with catalyst. Additionally, an oxidation catalyst inlet exhaust gas temperature sensor 22 and a filter inlet exhaust gas temperature sensor 23 are positioned for use as regeneration control of the filter 13b with catalyst. The oxidation catalyst inlet exhaust gas temperature sensor 22 is placed on the upstream side of the oxidation catalyst 13a and the filter 13b with catalyst. The filter inlet exhaust gas temperature sensor 23 is placed between the oxidation catalyst 13a and the filter 13b with catalyst.

The output values of these sensors are input into the control unit (ECU: engine control unit) 30. In addition to carrying out overall operational control of the engine 10, this control unit 30 also carries out regeneration control of the continuous regenerating DPF 13. The fuel injectors (injector nozzles) 14 of the engine 10, the intake throttle valve 16 that adjusts the amount of intake to the intake manifold 15 and the EGR valve (not shown in the diagram) for adjusting the EGR amount positioned in addition to the EGR cooler in the passage of the EGR are controlled by the control signals output from this control unit 30.

This fuel injection unit 14 is connected to the common rail injection system (not shown in the diagram) that briefly stores the fuel whose pressure has been raised by the fuel pump (not shown in the diagram). In order to operate the engine, information about vehicle speed and coolant temperature in addition to information about accelerator opening from the accelerator position sensor (ΔPS) 31 and the number of engine revolutions from the revolution sensor 32 are input into the control unit 30.

Figure 2:
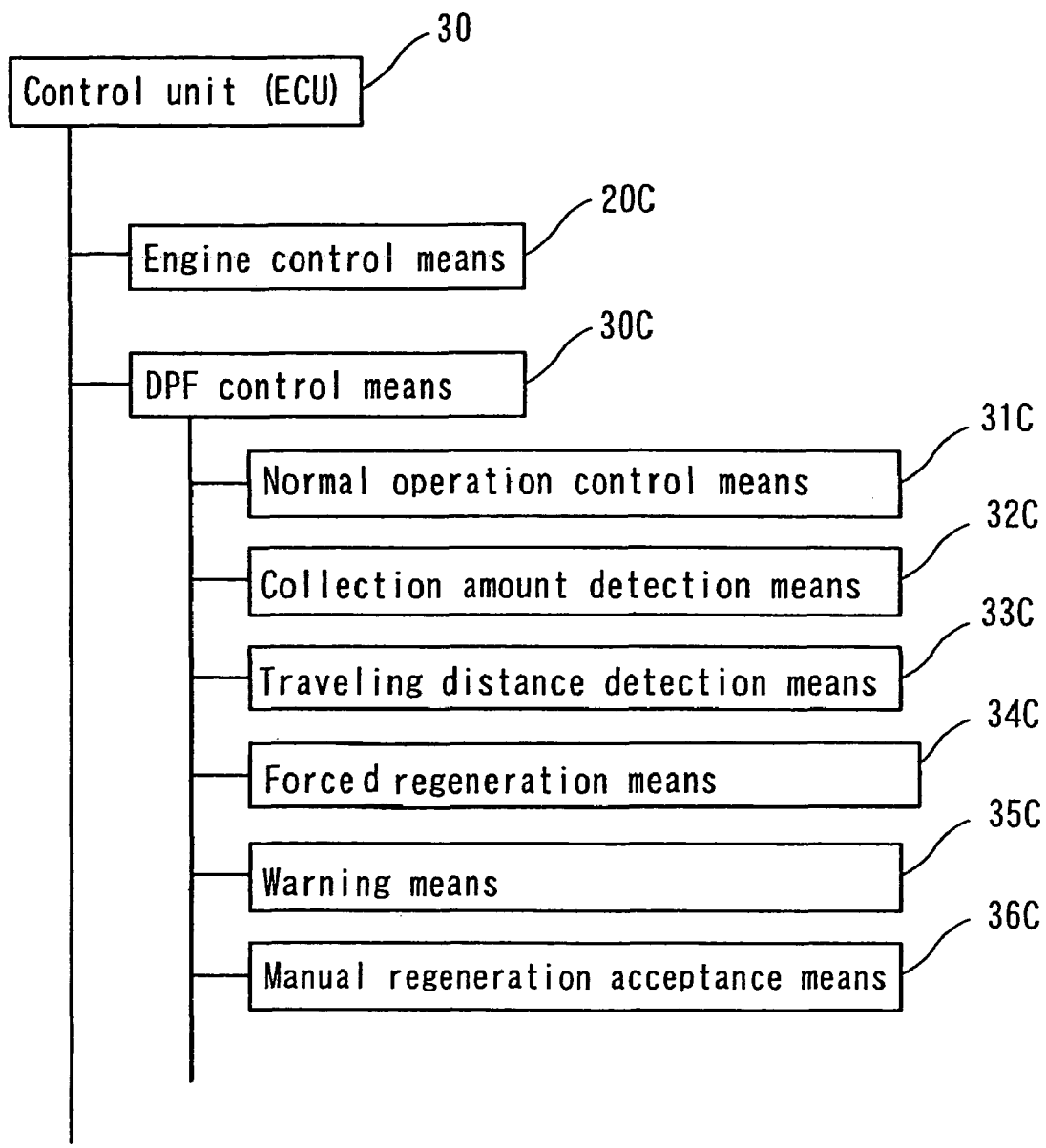
FIG. 2 is a diagram showing the structure of the control means of the exhaust gas purifying system according to an embodiment of the present invention.

As shown in FIG. 2, in this invention the control unit 30 comprises an engine control means 20C that controls the operation of the engine and a diesel particulate filter (DPF) control means 30C for the exhaust gas purifying system 1. This DPF control means 30C comprises a normal operations control means 31C, a collection amount detection means 32C, a traveling distance detection means 33C, a forced regenerating means 34C, a warning means 35C and a manual regeneration acceptance means 36C and the like.

The normal operation control means 31C is a means for carrying out normal operations that are conducted with no particular relation to the regeneration of the continuous regenerating DPF 13. This control means 31C carries out normal injection control. In this normal injection control, the prescribed amount of fuel is injected from the fuel injection unit 14 by means of conducting time signals calculated by the control unit 30 based on signals from the accelerator position sensor 31 and the revolution sensor 32.

The collection amount detection means 32C is a means for detecting the PM collection amount ΔPm collected by the filter 13b with catalyst of continuous regeneration DPF 13. Detection of this collection amount ΔPm is made by detecting the cumulative calculated value of the accumulated amount estimated from the engine revolution speed and load, the cumulative engine revolution time and the differential pressures before and after the continuous regenerating DPF device 13. In this embodiment, ΔPm is detected based on the differential pressures before and after the continuous regenerating DPF device 13, that is, it is based on the measured values from the differential pressure sensor 21.

The traveling distance detection means 33C is a means for detecting the distance ΔMc that the vehicle has traveled after DPF regeneration. When forced regeneration has been carried out, the distance ΔMc traveled in the appropriate period from the onset of regeneration up to regeneration completion is reset.

Control of the forced regeneration means 34C may vary somewhat depending on the type of continuous regenerating DPF 13. This forced regenerating means 34C carries out multi-injection (multistage injection) in the injection into cylinders of the engine 10 and causes the exhaust gas temperature to rise up to the activation temperature of the oxidation catalyst 13a. Then, post-injection (after-injection) is carried out and the filter inlet exhaust gas temperature that is detected by the filter inlet exhaust gas temperature sensor 23 is raised. In this manner, temperatures or an environment conducive to PM oxidation removal is created. Thus, the PM collected in the filter 13b with catalyst is forcefully combusted and eliminated and the filter 13b with catalyst is forcefully regenerated. Furthermore, intake system control of, for example, the intake throttle and EGR may also be implemented concomitantly in this forced regeneration.

The warning means 35C comprises a blinking lamp (DPF lamp) 41 and a warning lamp (warning lamp) 42. This warning means 35C is a means that gives a warning to the driver (operator) prompting manual operation of the forced regeneration means 34C by means of the blinking of the blinking lamp 41 and prompts the driver by means of the blinking of the warning lamp 42 to take the vehicle to a service center. Furthermore, the driver who has received this warning can operate the forced regeneration means 34C by turning on the manual regeneration switch 43.

The manual regeneration acceptance means 36C is a means for accepting the operation of manual regeneration when requested by the driver in accordance with the collected amount ΔPm of the PM and the distance ΔMc that the vehicle has traveled after DPF regeneration. This manual regeneration acceptance means 36C carries out the operations of verifying the long pushing of the manual regeneration switch (regeneration button) 43, the lighting of the blinking lamp 41, the blinking of the blinking lamp 41, verifying the pushing of the manual regeneration switch 43 and the operation of the forced regeneration means 34C done manually.

The DPF control means 30C comprising these various means is constructed so as to be a means for carrying out the following action based on the collection amount ΔPm of the PM detected by the collection amount detection means 32C and the traveling distance ΔMc after DPF regeneration detected by the traveling distance detection means 33C. Based on the collection amount ΔPm of the PM and the traveling distance ΔMc after DPF regeneration, normal operations from the normal operation control means 31C are continued, warning is given to the driver prompting the manual operation of the forced generation means 34C and the forced regeneration means 34C is caused to operate automatically.

Next, an explanation is given regarding the regeneration control of this exhaust gas purifying system 1 and in particular regarding the operation of the forced regeneration means 34C and the warning means 35C carried out by the DPF control means 30C. In the control of this exhaust gas purifying system 1, normal operations are conducted according to the normal operation control means 31C and the PM is collected. In this normal operation, control is exerted in accordance with the regeneration control flow shown in FIG. 3 at appropriate time intervals. In this control, after determining whether the collection amount ΔPm of the PM detected by the collection amount detection means 32C and the traveling distance ΔMc after DPF regeneration detected by the traveling distance detection means 33C has been entered into the prescribed range or not, in other words, is manual regeneration possible or is automatic traveling regeneration possible and after various types of processing depending on the necessity have been carried out, revert back and normal operations are further carried out by the normal operations control means 31C. Thus, the vehicle is operated while normal operations and regeneration control are repeated.

Figure 3:
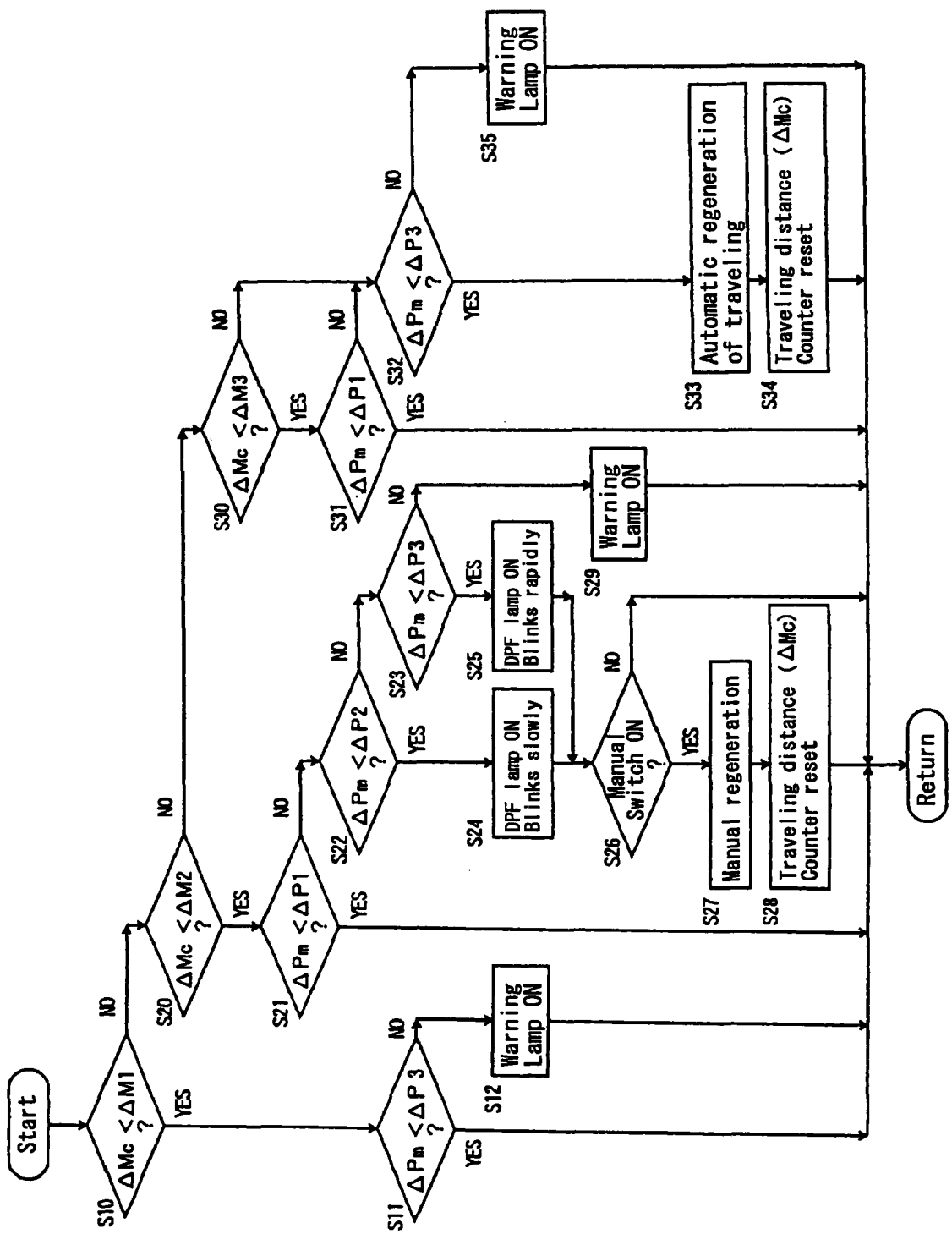
FIG. 3 is a diagram showing the regenerating control flow of the exhaust gas purifying system according to an embodiment of the present invention.
Figure 4:
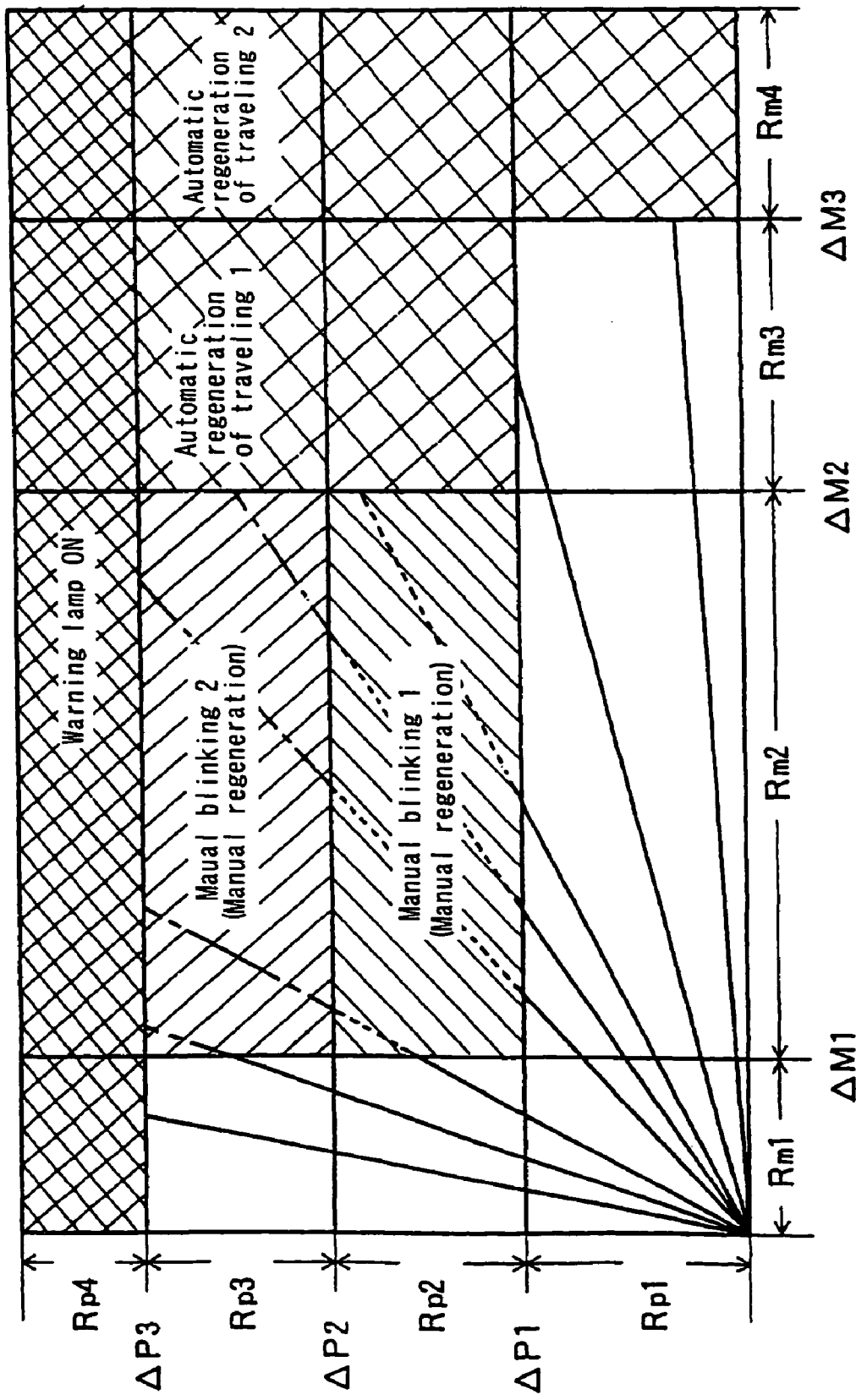
FIG. 4 is a diagram showing the schematic form of the map used for the regenerating control of the exhaust gas purifying system according to an embodiment of the present invention.

An explanation is now given regarding the regeneration control flow of FIG. 3 referencing the map used for regeneration control of FIG. 4 which is used to determine the necessity of forced regeneration control.

First, an explanation regarding the map used for regeneration control of FIG. 4 is given. The vertical axis in the map used for regeneration control shown schematically in FIG. 4 indicates the collection amount ΔP (differential pressure in this embodiment) of the PM (collected matter). The area of this collection amount ΔP is divided into four regions by three threshold values. The three threshold values are the first threshold value (the prescribed determining traveling distance) ΔP1, the second threshold value ΔP2 and the third threshold value ΔP3. The four regions are the first differential pressure region Rp1, the second differential pressure region Rp2, the third differential pressure region Rp3 and the fourth differential pressure region Rp4.

The horizontal axis indicates the traveling distance ΔM. The region of this traveling distance ΔM is divided into three threshold values and four regions. The three threshold values are the first threshold value (the prescribed determining traveling distance) ΔM1, the second threshold value ΔM2 and the third threshold value ΔM3. The four regions are the first traveling distance region Rm1, the second traveling distance region Rm2, the third traveling distance region Rm3 and the fourth traveling distance region Rm4.

Furthermore, this first threshold value (the prescribed determining traveling distance) ΔM1 is the value indicating the lower limit at which no oil dilution problem occurs when conducting forced regeneration manually. The second threshold value ΔM2 is the value indicating the lower limit at which no oil dilution problem occurs when conducting forced regeneration automatically while traveling. The third threshold value ΔM3 is the value at which forced generation is conducted in order to prevent thermal runaway and DPF erosion caused by uneven PM loading in the filter 13b with catalyst. Also, the fourth traveling distance region Rm4 is the region in which the third threshold value ΔM3 has been exceeded, forced regeneration is conducted automatically and the warning lamp lights automatically.

The following processing is conducted when necessary according to what region the current state is judged to be in according to regeneration control.

First, when the detected traveling distance $\Delta Mc$ has not exceeded the first threshold value $\Delta M1$ and is in the first traveling distance region Rm1, because of insufficient fuel evaporation in the oil, the problem of oil dilution occurs when conducting forced regeneration by hand (manually). As a result, for this case manual forced regeneration is prohibited. Furthermore, even in this case there is a lot of accumulated amount of PM per distance traveled depending on traveling patterns and there are times when the detected collection amount $\Delta Pm$ exceeds the third threshold value $\Delta P3$ and enters into the fourth differential pressure region Rp4. At this time, in order to prevent the PM collected in the continuous regenerating DPF 13 to begin self-combustion and to prevent thermal runaway (abrupt PM combustion) from occurring, manual regeneration and automatic traveling regeneration are in a prohibited state. In addition to this, the warning lamp 42 lights prompting the driver to go to the maintenance center.

Next, when the detected traveling distance $\Delta Mc$ has exceeded the first threshold value $\Delta M1$ and has entered into the second traveling distance region Rm2, because the traveling is still insufficient and evaporation of the fuel component mixed in the engine oil has not sufficiently been carried out, automatic forced regeneration is not carried out and a warning is given prompting manual regeneration by stopping the vehicle and carrying out forced regeneration manually. At this time, different warnings may be given depending on the magnitude of the detected collection amount $\Delta Pm$.

When the detected collection amount $\Delta Pm$ is smaller than the first threshold (the prescribed determining collection amount) $\Delta P1$, because the clogging of the filter 13b with catalyst is small and there is no necessity for operating the forced regeneration means 34C, normal operations continue without change. Furthermore, when the detected collection amount $\Delta Pm$ exceeds the first threshold value (prescribed determining collection amount) $\Delta P1$ and has entered into the second differential pressure region Rp2 in which the second threshold value $\Delta P2$ has not been exceeded, in order to avoid the problem of oil dilution at forced regeneration time, automatic traveling regeneration is prohibited. In conjunction with this, the blinking lamp (DPF lamp) 41 is caused to blink (manual blinking 1) slowly and the driver is prompted to stop the vehicle for manual forced regeneration (manual regeneration).

Additionally, when the detected collection amount $\Delta Pm$ has exceeded the second threshold value $\Delta P2$ and has entered into the third differential pressure region Rp3 in which the third threshold value $\Delta P3$ has not been exceeded, in order to avoid the problem of oil dilution at forced regeneration time, automatic traveling regeneration is prohibited. Together with this, the blinking lamp 41 is caused to blink (manual blinking 2) rapidly and the driver is strongly prompted to stop the vehicle and carrying out forced regeneration manually. When in this third differential pressure region Rp3, depending on operating conditions the PM collected in the continuous regenerating DPF 13 begins self-combustion, thermal runaway (abrupt PM combustion) occurs and the likelihood of erosion in the filter 13b with catalyst becomes more serious. As a result, throttle adjustments of fuel injection are rigidly made at the same time due to fears of self-ignition.

When the detected collection amount $\Delta Pm$ has exceeded the third threshold value $\Delta P3$ and entered into the fourth differential pressure region Rp4, in order to avoid thermal runaway, manual regeneration and automatic traveling regeneration are not conducted. In addition to this, the warning lamp 42 lights and the driver is prompted to go to the service center.

Next, when the detected traveling distance $\Delta Mc$ has exceeded the second threshold value $\Delta M2$ and entered into the third traveling distance region Rm3, evaporation of the fuel component mixed in the engine oil has taken place sufficiently and automatic forced regeneration (automatic traveling regeneration) is now possible while traveling. As a result, when the detected collection amount $\Delta Pm$ exceeds the first threshold (prescribed determining collection amount) $\Delta P1$ and has entered the second collection amount region Rp2, automatic traveling regeneration in which the forced regeneration means 34C is caused to operate automatically is carried out while traveling. Because of this automatic traveling regeneration the driver is relieved of any load pertaining to operating forced regeneration manually, that is, pertaining to ON/OFF operations of the manual regeneration switch 43. Furthermore, when the detected collection amount $\Delta Pm$ is smaller than the first threshold value (the prescribed determining collection amount) $\Delta P1$, there is very little clogging of the filter 13b with catalyst and there is no necessity for operating the forced regeneration means 34C. As a result, normal operations continue without change.

When the detected traveling distance $\Delta Mc$ exceeds the third threshold value $\Delta M3$ and has entered into the fourth traveling distance region Rm4, evaporation of the fuel component mixed in the engine oil has been sufficiently carried out and automatic forced regeneration while traveling is now possible. As a result, in the range where the detected collection amount $\Delta Pm$ does not exceed the third threshold value $\Delta P3$, automatic forced regeneration is conducted while traveling without any relation to the detected differential pressure $\Delta Pm$ and the accumulated PM is burned and removed. However, when the detected collection amount $\Delta Pm$ exceeds the third threshold value $\Delta P3$ and has entered into the fourth differential pressure region Rp4, in order to avoid thermal runaway, manual regeneration and automatic traveling regeneration are in a prohibited state. Together with this the warning lamp 42 is lit and the driver is prompted to go to the service center.

The control indicated in the regeneration control map shown in FIG. 4 can be attained by the regeneration control flow shown in FIG. 3. When the regeneration control flow of FIG. 3 starts, it is judged in Step S10 whether the detected traveling distance $\Delta Mc$ exceeds the first threshold value (prescribed determining traveling distance) $\Delta M1$ or not. When it is determined that the value has not been exceeded and $\Delta M1$ is in the first traveling distance region Rm1, it is determined in Step S11 whether the detected collection amount $\Delta Pm$ exceeds the third threshold value $\Delta P3$ or not. When it is determined that it does not, the process goes to return without change and normal operations continue. Additionally, when it is determined that it has exceeded it, the warning lamp 42 lights in Step S12 when going to return.

Consequently, when it is determined that it is in the first traveling distance region Rm1 by the judgment of Step S10, operation of the forced regeneration means 34C manually is prohibited. Furthermore, automatic traveling regeneration in which operation of the forced regeneration means 34C is carried out manually is not conducted.

When the traveling distance $\Delta Mc$ exceeds the first threshold value (prescribed determining traveling distance) $\Delta M1$ in Step S10, it is determined in Step S20 whether the traveling distance $\Delta Mc$ exceeds the second threshold value $\Delta M2$ or not. When it is determined that it does not, it is determined in Step S21 whether the collection amount $\Delta Pm$ exceeds the first threshold value (prescribed determining collection amount) $\Delta P1$ or not. When it is judged in this step S21 that it does not, the process goes to return and normal operations continue.

When the collection amount ΔPm exceeds the first threshold value (prescribed determining collection amount) ΔP1 in Step S21, it is judged in Step S22 whether the collection amount ΔPm exceeds the second threshold value ΔP2 or not. When it is determined in this judgment that it does not, in Step S24 the blinking lamp (DPF lamp) 41 blinks slowly and in Step S26 the ON/OFF of the manual regeneration switch is determined.

Furthermore, when the collection amount ΔPm in the judgment of Step S22 exceeds the second threshold value ΔP2, it is determined in Step S23 whether the collection amount ΔPm exceeds the third threshold value ΔP3 or not. When in this judgment it does not, in Step S25 the blinking lamp (DPF lamp) 41 blinks rapidly and in Step S26 the ON/OFF of the manual regeneration switch is determined.

When the manual regeneration switch 43 is ON in Step S26, manual regeneration is conducted in Step 27 in which the forced regenerating means 34C is caused to operate because of the ON of the manual regeneration switch 43 of Step S26 and in Step S28 the counter of the traveling distance ΔMc is reset and the process goes to return. Furthermore, when the collection amount ΔPm is determined by the accumulated amount of PM and not by differential pressure, this accumulated PM amount also resets. Additionally, when in Step S26 the manual regeneration switch 43 is not ON, the process goes without change to return and during the repetition of this regeneration control flow waits until the driver has turned the manual regeneration switch 43 to ON.

When in the judgment of Step S23 the collection amount ΔPm exceeds the third threshold value ΔP3, manual regeneration and automatic traveling regeneration are in a prohibited state and in Step S29 the warning lamp 42 is lit and the process goes to return.

Further, when in the judgment of Step S20 the traveling distance ΔMc exceeds the second threshold value ΔM2, it is determined in Step S30 whether the traveling distance ΔMc exceeds the third threshold value ΔM3 or not. When it is judged that it does not in Step S30, in Step 31 it is determined whether the collection amount ΔPm exceeds the first threshold value (prescribed determining collection amount) ΔP1 or not. When in this Step 31 it is determined that it does not, the process goes without change to return and normal operations continue. Additionally, when in Step S31 it does exceed the threshold value, the process moves to the judgment of Step S32. Also, when it exceeds the value in Step S30, the process also goes to the judgment of Step S32.

In Step S32 a determination is made whether the collection amount ΔPm exceeds the third threshold value ΔP3 and when it does, manual regeneration and automatic traveling regeneration are in a prohibited state and in Step S35 the warning lamp 42 is lit and the process goes to return.

Furthermore, when in judgment of Step S32 the collection amount ΔPm does not exceed the third threshold value ΔP3, in Step S33 automatic traveling regeneration in which the forced regeneration means 34C is caused to operate automatically is conducted while traveling and in Step S34 the counter of the traveling distance ΔMc is reset and the process goes to return. Additionally, when the collection amount ΔPm is determined by the accumulated amount of PM and not by differential pressure, this PM accumulated amount is also reset.

The following is possible according to the control that complies with the regeneration control flow shown in FIG. 3.

Even when the collection amount ΔPm detected by the collection amount detection means 32C is detected as being greater than the prescribed determining collection amount (the first threshold value) ΔP1, when the traveling distance ΔMc after the onset of collection detected by the traveling distance detection means 33C is deemed not to have reached the prescribed determining traveling distance (the first threshold value) ΔM1, no warning is given by the warning means 35C and it is possible to carry out control in which the operation of the forced regeneration means 34C by the driver is prohibited.

Furthermore, when the traveling distance ΔMc after the onset of collection detected by the traveling distance detection means 33C has reached the prescribed determining traveling distance (the first threshold value) ΔM1 but has not reached the second threshold value ΔM2 and when the collection amount ΔPm detected by the collection amount detection means 32C is detected as being greater than the prescribed determining collection amount (the first threshold value) ΔP1, the blinking lamp (DPF lamp) 41 is caused to blink slowly and the driver can be prompted to operate the manual regeneration switch 43 manually. When this blinking lamp 41 blinks, the driver must quickly stop the vehicle, operate the manual regeneration switch 43 and carry out forced regeneration manually. However, when this warning is disregarded and the PM in the filter 13b with catalyst builds up and the detected collection amount ΔPm exceeds the prescribed second threshold value ΔP2, the blinking lamp 41 is caused to blink rapidly and it is possible to give a clear warning to the driver strongly prompting manual regeneration.

This invention is so structured that even when the DPF control means 30C detects the fact that the collection amount ΔPm detected by the collection amount detection means 32C is smaller than the first threshold value (the prescribed determining collection amount) ΔP1 and detects when the traveling distance ΔMc after the onset of collection detected by the traveling distance detection means 33C is determined to have reached the first threshold value (the prescribed determining traveling distance) ΔM1, the operation of the forced regeneration means 34C by the driver is structured to be allowed.

Figure 5:
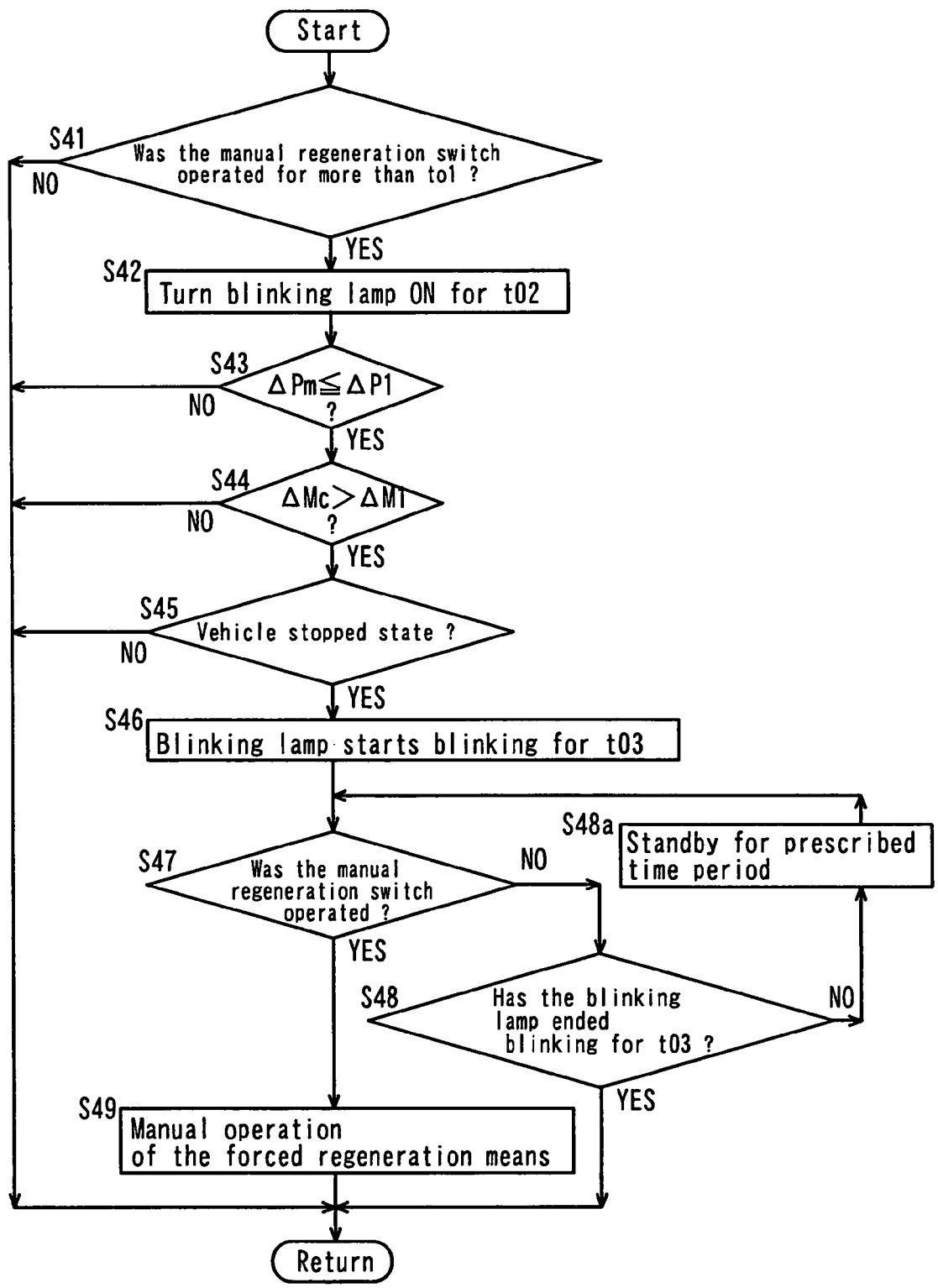
FIG. 5 is a diagram showing the control flow for allowing manual regeneration of the exhaust gas purifying system according to an embodiment of the present invention.
Figure 6:
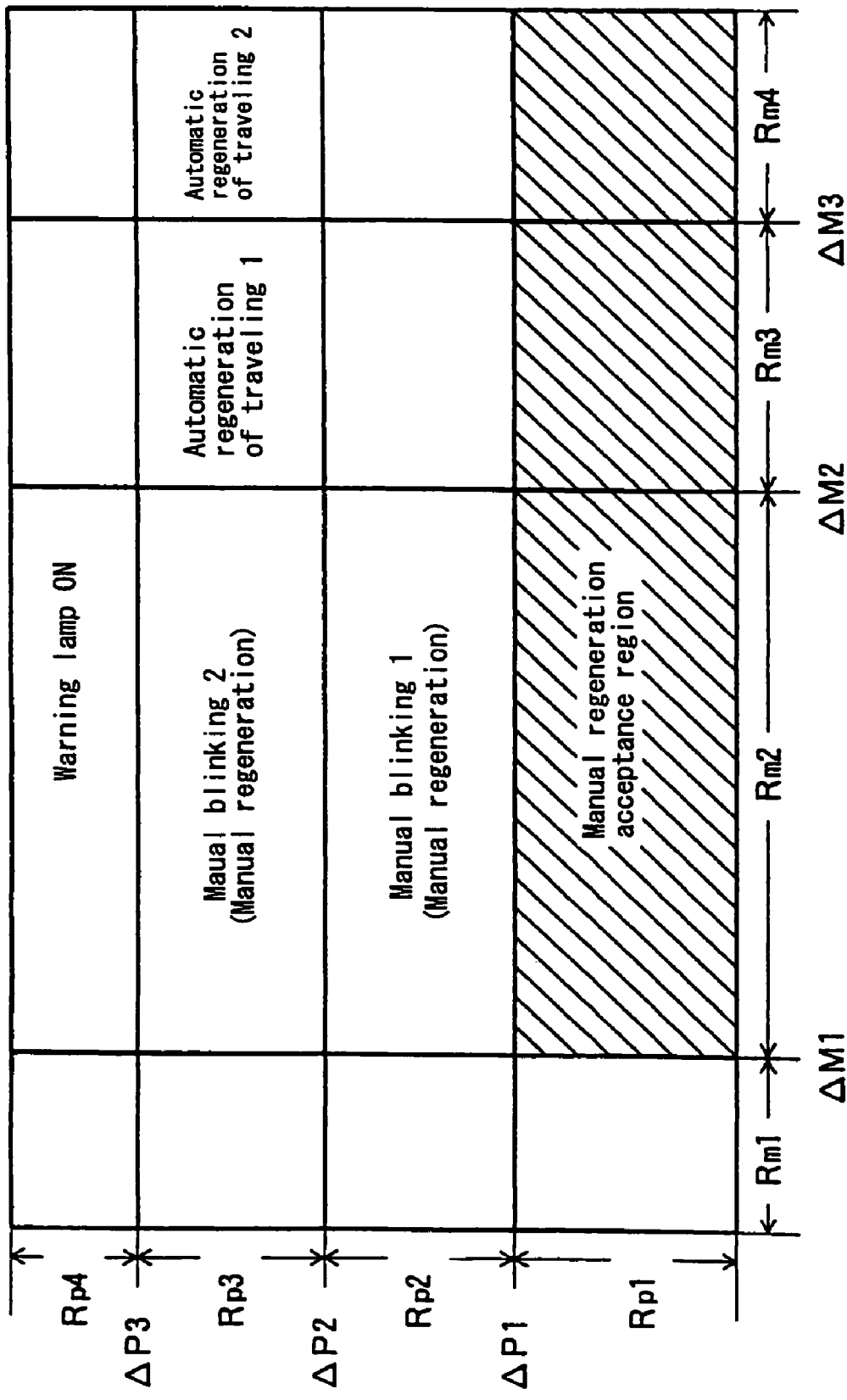
FIG. 6 is a diagram showing the schematic form of the areas for allowing manual regeneration of the exhaust gas purifying system according to an embodiment of the present invention.

The control flow shown in FIG. 5 has been added as the control flow that has this structure. The region indicated by the diagonal lines of FIG. 6 is structured so that manual regeneration is accepted upon an operation requested by the driver. Furthermore, the time series relationship between the operation of the manual regeneration switch 43 and the lighting or blinking of the blinking lamp 41 is shown in FIG. 7.

First, an explanation is given regarding the control flow of FIG. 5. This control flow shows that it can be implemented in parallel with the control flow of FIG. 3. Furthermore, when operation of the forced regeneration means 34C is emphasized, the appropriate side has priority.

When this control flow starts, Step S41 determines whether the manual regeneration switch 43 has been depressed or not and if it has not, the process goes to return. When Step S41 detects that the manual regeneration switch has been depressed longer that the prescribed first time t01 (e.g., 3 seconds), in order to inform the driver that the manual regeneration switch 43 has been long depressed in Step S42, the blinking lamp 41 is caused to blink during the prescribed second time t02 (e.g., 3 seconds) and the process moves to Step S43.

In Step S43 the collection amount ΔPm is determined as being below the first threshold value (the prescribed determining collection amount) ΔP1 or not and if above, the process goes to return. If, in Step S43, the collection amount ΔPm is below the first threshold value ΔP1, in the next Step S44 a determination is made whether the traveling distance ΔMc after the onset of collection exceeds the first threshold value (the prescribed determining traveling distance) ΔM1 or not. If it does not, the process goes to return. If the traveling distance ΔMc after the onset of collection exceeds the first threshold value ΔM1 in the judgment of Step S44, the process moves to the manual regeneration acceptance Step S45.

In Step S45 the vehicle is determined as being stopped or not and if not in a vehicle stopped state, the process goes to return. Furthermore, if the vehicle is in a stopped state, the process moves to Step S46 and blinking of the blinking lamp 41 for the prescribed third time t03 (e.g., 10 seconds) begins.

Then, the following Step S47 detects whether the manual regeneration switch 43 has been operated by the driver or not. When the manual regeneration switch 43 has not been operated in this Step S47, the process moves to Step S48 and it is determined whether the prescribed blinking for the third time t03 of the blinking lamp 41 is completed or not. When it is determined that it is not completed, after being in standby in Step S48a for a prescribed time, that is, an interval in which the presence or absence of operation of the manual regeneration switch 43 is detected, it returns to Step S47. If the manual regeneration switch 43 is operated in Step S47, until the blinking of the blinking lamp 41 in Step S48 completes the prescribed third time t03, Steps S47, S48 and S48a continually repeat. When the manual regeneration switch 43 has not been operated in the middle of the blinking during the prescribed third time t03 of the blinking lamp 41, the process goes to return.

Additionally, when the manual regeneration switch 43 is operated in the middle of the blinking for the prescribed third time t03 and the operation of the manual regeneration switch 43 is detected in Step S47, the process moves to Step S49. In this Step 49 operation of the forced regeneration means 34C is carried out manually. That is to say, manual regeneration is carried out in the state of stopping vehicle. When the manual regeneration of this Step S49 is completed, the process goes to return.

With the addition of the control flow of FIG. 5, the following control structure is realized. When the collection amount ΔPm is in the first collection amount area Rp1 in which it is smaller than the first threshold value (the prescribed determining collection amount) ΔP1 and the traveling distance ΔMc after the onset of collection does not exceed the first threshold value (the prescribed determining traveling distance) ΔM1 and is in the first traveling distance region Rm1, manual regeneration is prohibited. Furthermore, as shown by the diagonal lines in FIG. 6, when the traveling distance ΔMc after the onset of collection exceeds the first threshold value (the prescribed determining traveling distance) ΔM1 and is in the second traveling distance region Rm2, the third traveling distance region Rm3 or the fourth traveling distance region Rm4, manual regeneration is accepted upon the driver's request.

The control flow of FIG. 5 is the control shown by the time series in FIG. 7. That is to say, when the manual regeneration of FIG. 7 (a) is possible, that is, when the traveling distance ΔMc after the onset of collection reaches the first threshold value ΔM1, when the manual regeneration switch 43 is depressed longer than the first time t01, the blinking lamp 41 for the prescribed second time t02 lights. Then, the blinking lamp 41 for the prescribed third time t03 is caused to blink. When the manual regeneration switch 43 is operated again during the blinking for the prescribed third time t03 of the blinking lamp 41, the forced regeneration means 34C is operated and manual regeneration is carried out.

On the other hand, when the manual regeneration of FIG. 7 (b) is not possible, that is, when the traveling distance ΔMc after the onset of collection has not reached the first threshold value ΔM1, when the manual regeneration switch 43 has been depressed longer than the prescribed first time t01, as verification that the manual regeneration switch 43 has been operated, the blinking lamp 41 is caused to light for the prescribed second time t02. However, because the traveling distance ΔM1 has not been covered in which the dilution amount produced in the manual regeneration after carrying out the previous forced regeneration has been volatilized, the subsequent blinking of the blinking lamp 41 is not carried out. In this manner, the driver is made aware that manual regeneration is not in a state where it can be serviced. In this case, even if the manual regeneration switch 43 is operated again, it is ignored, the forced regeneration means 34C is not operated and manual regeneration is not carried out.

Consequently, according to the above structure, even when the collection amount ΔPm detected by the collection amount detection means 32C is detected to be smaller than the prescribed determining collection amount ΔP1, when the traveling distance ΔMc after the onset of collection detected by the traveling distance detection means 33C is determined to have reached the prescribed determining traveling distance ΔM1, control is exerted so that the DPF control means 30C accepts the operation of the forced regeneration means 34C upon driver operational request.

Additionally, when allowing the operation of the forced regeneration means 34C by the driver, the DPF control means 30C determines whether the traveling distance ΔMc after the onset of collection detected by the traveling distance detection means 33C has reached the prescribed determining traveling distance ΔM1 or not upon the driver's operational request. When it is determined that the prescribed determining traveling distance ΔM1 has been reached, this indicates that operation of the forced regeneration means 34C is feasible and when a second operation request is made by the driver, it is possible to cause the forced regeneration means 34C to operate.

Consequently, it is possible to carry out manual regeneration and forcefully regenerate the continuous regenerating DPF 13 when convenient for the driver while preventing wear or seizing of the machine sliding parts caused by oil dilution at forced regeneration time. As a result, the frequency of the blinking of the blinking lamp 41 when manual regeneration is requested is minimized and prompting of manual regeneration when it is difficult for the driver to carry out manual regeneration is decreased. Consequently, driver annoyance is reduced and convenience is enhanced.

Further, as a continuous regenerating DPF device in an exhaust gas purifying system, an explanation has been given of an example for this invention of a device having an oxidation catalyst set up on the upstream side of a filter in addition to having the catalyst supported on the filter but this invention is not limited to this and can be used in other types of continuous regenerating DPF such as devices in which an oxidation catalyst is supported on a filter or devices with an oxidation catalyst set up on the upstream side of a filter.

INDUSTRIAL APPLICABILITY

The exhaust gas purifying system of the invention having the outstanding above-described results can be used as an exhaust emission processing system for internal combustion engines such as a diesel engine in an automobile.

What is claimed is:

1. An exhaust gas purifying system for a diesel engine comprising;
    a continuous regenerating diesel particulate filter in a passage of an exhaust gas from an engine in a vehicle; and
    a diesel particulate filter control means having
        a collection amount detection means that detects an amount of collected matter in the continuous regenerating diesel particulate filter,
        a traveling distance detection means for detecting a distance that the vehicle has traveled after regeneration of the continuous regenerating diesel particulate filter, a forced regeneration means in which an exhaust temperature is caused to increase, wherein the collected matter is forcefully combusted and the continuous regenerating diesel particulate filter is caused to regenerate, and a warning means that, when the detected collection amount ($\Delta Pm$) is detected as being greater than a first threshold value ($\Delta P1$) based on a prescribed determining collection amount, issues a warning prompting a driver to operate manually the forced regeneration means, wherein the diesel particulate filter control means performs automatic traveling regeneration, when the detected traveling distance ($\Delta Mc$) exceeds a second threshold value ($\Delta M2$) and when the detected collection amount ($\Delta Pm$) exceeds the prescribed determining collection amount ($\Delta P1$), accepts the operation of the forced regeneration means, when such operation is manually requested by the driver, if the detected traveling distance ($\Delta Mc$) is determined to have reached another first threshold value $\Delta M1$ based on a prescribed determining traveling distance which is an upper limit at which oil dilution occurs when a manual forced generation is performed while a vehicle is stopped, and which is the first threshold value ($\Delta M1$) being smaller than the second threshold value ($\Delta M2$), even when the detected collection amount ($\Delta Pm$) is detected as being smaller than the prescribed determining collection amount ($\Delta P1$).

2. The exhaust gas purifying system according to claim 1 wherein, when determining whether to accept the operation of the forced regeneration means again requested by the driver, the diesel particulate filter control means determines whether the detected traveling distance ($\Delta Mc$), after the beginning of collection, has reached the prescribed determining traveling distance ($\Delta M1$) or not, indicates that the operation of the forced regeneration means is possible when the detected traveling distance ($\Delta Mc$) is determined to have reached the prescribed determining traveling distance ($\Delta M1$) and operates the forced regeneration means.

* * * * *